Figure 1:
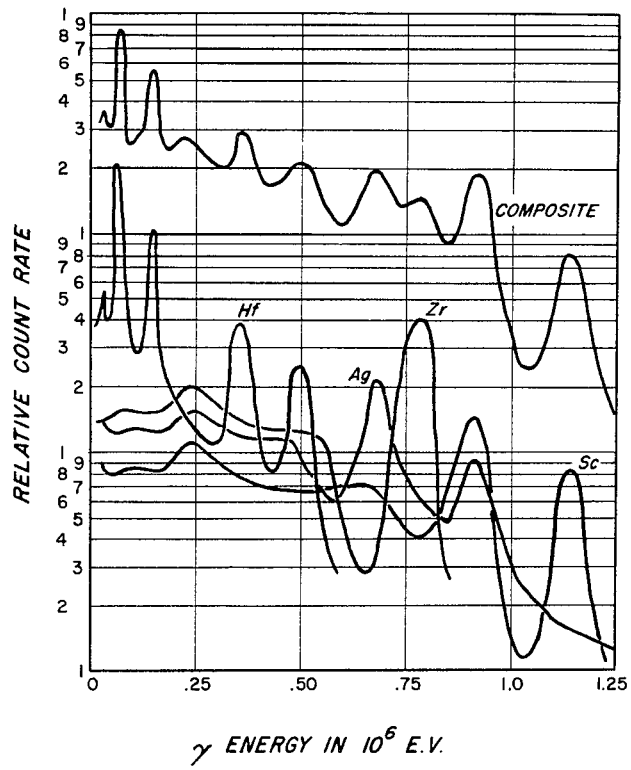

INVENTORS:
Arthur C. Herrington
William A. Wilson

BY

ATTORNEY

United States Patent Office 3,252,916
Patented May 24, 1966

3,252,916
PROCESS FOR IMPREGNATING AN ADSORBENT CATALYST WITH A RADIOACTIVE METAL ISOTOPE
William A. Wilson, Griffith, Ind., and Arthur C. Herrington, Boston, Mass., assignors to Standard Oil Company, Chicago, Ill., a corporation of Indiana
Original application June 30, 1960, Ser. No. 39,901, now Patent No. 3,149,233, dated Sept. 15, 1964. Divided and this application Sept. 13, 1962, Ser. No. 227,625
5 Claims. (Cl. 252—301.1)

This is a division of application Serial No. 39,901, filed June 30, 1960, and entitled "Chemical Process," now U.S. Patent No. 3,149,233, granted Sept. 15, 1964.

This invention relates to the conversion of hydrocarbons with fluidized solid catalysts, and more particularly concerns methods of studying the performance of such units. In more detail, the invention provides a method for determining catalyst loss rates from fluid catalytic conversion units.

In the operation of fluid catalytic conversion units such as fluid catalytic crackers, it is frequently necessary to measure and study the catalyst loss rate. Not only is excessive catalyst loss expensive, but information pertaining to its is invaluable for analyzing overall unit performance.

However, the measurement of fluid catalyst loss rate is possibly one of the most difficult of all material balances. Not only is catalyst lost via flue gas stacks and the like, but a portion at least is carried out in the cracked hydrocarbon product stream. Moreover, catalyst particle size distribution is constantly being changed by attrition.

It has previously been proposed to measure catalyst loss, or its correlative opposite, catalyst retention, by tagging portions of the catalyst inventory with radioactive isotopes and following the course of catalyst disappearance by measuring the progressive reduction in radiation level. However, radioisotopes are rarely absolutely pure, and the contribution of each isotope to total radioactivity may change radically with time, depending on the relative decay rates of the isotopes. It has been proposed to minimize this effect by using a long half life isotope, with, however, attendant long-term contamination problems. Neither alternative is really satisfactory.

In accordance with the invention we have discovered a method whereby even short half life radioisotopes may be used in catalyst loss or retention studies without requiring unduly complex mathematical treatment to allow for normal radioactive decay. Moreover, our method permits simultaneous loss measurements on several different catalyst samples within the same fluidized catalytic conversion unit. We also provide a method whereby the finely divided adsorbent solids which are employed as conversion catalysts may be uniformly impregnated with radioactive metal isotopes.

Briefly, we uniformly impregnate samples of one or more finely divided adsorbent solid catalysts with different radioactive metal isotopes each having a distinguishable energy spectrum. Portions of each catalyst are retained, while the balance is introduced into a fluid catalytic conversion unit such as a cat cracker, a fluid hydroformer, or the like. Periodically, catalyst samples are withdrawn from the inventory of the unit, and the energy spectrum of these inventory samples are determined, as by means of a multi-channel pulse height analyzer. At substantially the same time, i.e., sufficiently close in time that the same isotope will have decayed to substantially the same extent in the retained and in the inventory samples, the energy spectrum of each of the retained portions are also analyzed. The contribution to the inventory sample radioactivity by each of the different radioactive metal isotopes, corresponding to the relative proportion of each originally impregnated catalyst sample to the total inventory, is then determined as by direct curve substraction or by means of a computer technique hereinafter disclosed. Thus, by determining the amount of each originally impregnated catalyst sample in the inventory it is possible to measure the loss rates of one, two or many more catalysts. Also, since the analysis or counting of each sample is performed concurrently with the analysis of the retained samples, an isotope in each sample will decay to substantially the same extent and the need for correcting for radioactive decay rates is obviated entirely.

We also provide a novel technique for uniformly impregnating finely divided adsorbent solids with radioactive isotopes. Heretofore this has been a major stumbling block in tracer monitoring of fluid catalytic conversion units, since the individual catalyst particles may range in size from less than ten microns to over two hundred microns. By our technique, every particle size fraction is impregnated with radioactive material to a uniformity of within 15% over the range of 40 to 145 microns. In accordance with this aspect of the invention, we form a slurry of the finely divided absorbent solid catalyst, or other similar solid material, with an inert volatile organic liquid. We separately prepare a solution of a radioactive metal isotope, advantageously in the form of a soluble coordination compound in another inert volatile organic liquid which is miscible with the first mentioned liquid; the two liquids may be either the same or different substances. The slurry and solution are then intimately mixed to permit the solids to adsorb the dissolved isotope, after which excess liquid may be removed and the resultant impregnated solid then dried. This technique affords the outstanding advantages of not altering any of the chemical or physical properties of the original solid, factors which are crucial in any meaningful studies of catalyst loss rate.

Figure 2:
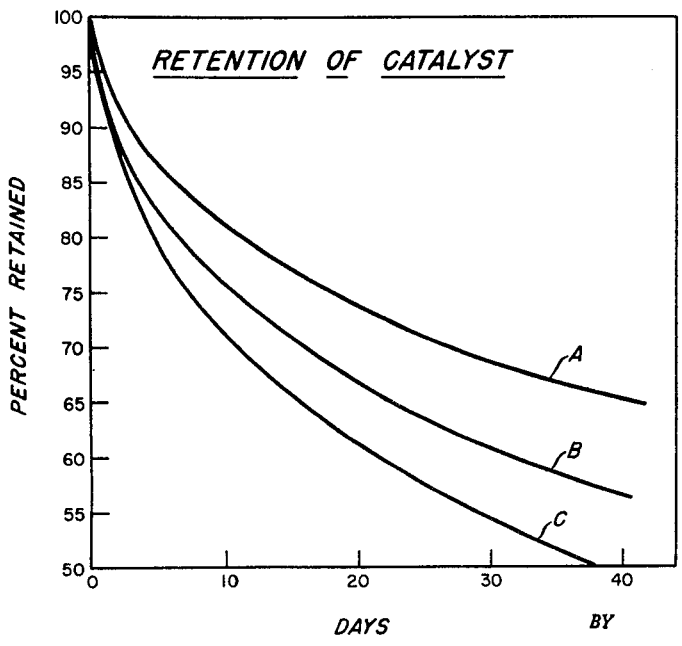

The invention will be more fully described in the ensuing specification, when read in conjunction with the attached drawings wherein:

FIGURE 1 depicts a typical multi-channel spectra analysis of the emitted gamma energy from several radioisotopes having distinguishable energy spectra together with a typical composite corresponding to a mixture of the radioisotopes in the inventory of a fluid catalytic conversion unit; and FIGURE 2 shows the results of a test wherein the relative loss rates of three different commercial cracking catalysts in an operating catalytic cracking unit are determined.

*Catalyst impregnation*

In any tracer study of fluid catalytic conversion units, it is essential that the portion of catalyst which is tagged with a radioisotope have physical and chemical properties which are identical to the untagged catalyst. For this reason, any impregnation technique must not affect the catalyst. Accordingly, a technique has been developed whereby a catalyst may be tagged with virtually any desired concentration of virtually any radioactive metal isotope, without any noticeable alteration of catalyst properties.

In brief, a finely divided absorbent solid such as a silica-alumina cracking catalyst is slurried with an inert volatile organic liquid. By the term "inert" we designate those liquids which are not decomposed by contact with the catalyst, and which do not chemically react with it. For example, ethers such as diethyl ether, alcohols such as methanol, hydrocarbons such as hexane, ketones such as methyl ethyl ketone, and similar liquids may be employed. The liquid should be sufficiently volatile to permit its removal from the catalyst after impregnation treatment without the use of undue temperatures.

Radioactive metal isotopes are commonly available from such sources as the U.S. Atomic Energy Commission as inorganic salts in aqueous solution. The metals are advantageously extracted from the aqueous solution into an immiscible organic liquid such as diethyl ether preferably in the form of a soluble coordination compound (see Bailar, "Chemistry of the Coordination Compounds," ACS Monograph 131, Reinhold).

The slurry of solids in the organic liquid, and the solution of radioisotope in organic liquid (which may be the same or different liquid from the liquid first mentioned) are then intimately mixed, advantageously with constant stirring. Temperatures for this step are advantageously at the boiling point so as to secure the benefits of having a mobile liquid. Impregnation occurs rapidly and virtually quantitatively. Excess liquid may be decanted off, and the impregnated solids are then dried.

As an example of an impregnation procedure along the lines previously described, zirconium–95 is impregnated onto a 12% alumina cracking catalyst. The isotope is available as a mixture of zirconium–95 and niobium–95 as the oxalates in about 0.5% aqueous oxalic acid. Radioactivity is more than one mc./ml. The solution is wet-ashed with perchloric acid to remove traces of fluoride and oxalate ions which will interfere with the subsequent extraction. The final wet ash is diluted to 20 ml. with one M nitric acid. Extraction is effected using thenoyltrifluoroacetone (TTA), 0.5 M in 200 ml. of diethyl ether. The two phases are agitated for about an hour, and greater than 99% of the zirconium is extracted, while virtually all of the niobium remains in the aqueous solution. The solid catalyst is slurried in about twice its weight of pure diethyl ether, and with constant stirring sufficient of the extracted zirconium–TTA complex solution is slowly added to provide the desired level of radioactivity. After about 30 minutes at the boiling point of around 34.6° C., the supernatant ether is siphoned off, and the catalyst dried by evaporation, heated to 200° C. for two hours to remove residual adsorbed ether, and, upon cooling, humidified with wet nitrogen for about two hours.

Hafnium–181 is available as hafnium oxychloride in one normal aqueous hydrochloric acid. It is impregnated onto a different catalyst by a procedure exactly identical to that used in impregnating zirconium–95.

A third catalyst is impregnated with scandium–46, obtainable as the trichloride in one normal hydrochloric acid. In this case, it is advisable to pretreat the catalyst to be tagged with 100 p.p.m. of cerium in the form of a TTA complex; cerous ion will extract into TTA–diethyl ether from a neutral solution. The cerium extract is added to the catalyst while being stirred in reflux ether prior to the scandium addition. Scandium impregnation follows the procedure for zirconium hafnium.

Gold–198 may be impregnated onto a catalyst as the thiocyanate. Gold–198 is available as the trichloride in mixed hydrochloric and nitric acids. To 10 ml. of the mixed acids solution is added an excess of potassium thiocyanate. The resultant solution is extracted three times with separate portions of 100 ml. of diethyl ether. Five pounds of catalyst is slurried in 6 liters of ether at reflux temperature and the gold extracts are added during stirring. Uniform quantitative deposition occurs immediately. The ether is filtered off and the catalyst dried by gentle heating under a nitrogen sweep until it is again fluid.

Each of the foregoing procedures yields a catalyst which is uniformly impregnated with radioactive material. In tests of catalysts impregnated according to the methods described previously, catalysts were screened and fractions taken at 40, 50, 60, 70, 90, 120, and 145 micron screen size. The specific activity of each fraction was within 15% of the average specific activity, and in most instances was much less than 10%. Other impregnation procedures may of course be employed, either for the specific isotopes described above or for other radioactive metals, and in this connection attention is invited to the previously cited Bailar book. Coordination compounds, especially the organic compounds such as aspartic acid, ethylene diamine tetraacetic acid, in addition to TTA and the like are especially preferred.

Tracer catalyst addition

At the beginning of a test, a number of different catalysts, say competitive commercial cracking catalysts obtained from different manufacturers, are each tagged with a radioactive metal isotope having mutually distinguishable energy spectra. Known amounts, about 100 mg., of each tagged catalyst and of the mixture of all tagged catalysts to be charged to the fluid catalytic conversion unit are each separately mixed with two kilograms of nonradioactive equilibrium catalyst and then sealed into a separate counting can. These constitute the standard samples.

The larger portions of the tagged catalyst are then introduced into fluid catalytic conversion unit. Such introduction may be effected by conventional means well known to those in the art, e.g. by adding to a gas stream passing into a cat cracker regenerator, or by slurrying with oil and introduction into a cat cracker reactor.

Counting techniques

Within an hour or two after the several tagged catalyst samples are introduced to the unit, a small portion of the units inventory, say ten pounds, is withdrawn. It is necessary to wait sufficient time for the tagged catalyst to achieve even distribution throughout the bulk of the inventory, but this usually occurs within less than an hour or so. Thereafter, samples may be collected from the regenerator at intervals of about once daily during a test period, which may run for, say, forty days or more.

Sample counting is done with a Radiation Instrument Development Laboratory 200 channel pulse height analyzer (Model 3302) and a 5½" x 5" NaI(Tl) scintillation crystal mounted with a light pipe to a 3" E.M.I. photomultiplier. Catalyst samples to be counted are weighed into special ten pound sample cans fitted with a well to slide over the crystal. The samples are counted for a given time, usually five or ten minutes, until a large number of counts accumulate in peak channels.

Each day the collected sample of the unit's inventory and the standard samples of originally impregnated catalyst are counted. The results, as observed on an oscilloscope screen, have a configuration resembling that shown in FIGURE 1, although the figure is plotted on semi-log paper. The composite spectrum represents the sum of the contribution from each isotope in proportion to the concentration of that isotope in the composite. It will be observed that each peak on the composite corresponds to a peak on either the hafnium, the silver, the zirconium, or the scandium curves for pure standards.

It will be understood that each of the curves is expressed on a background-free basis. A background count may be made in the usual way, and the pulse height analyzer herein employed is capable of internally subtracting the background count from each pulse channel.

Computation techniques

After obtaining information such as that shown in FIGURE 1, it is necessary to determine the relative proportion of each catalyst sample, or in other words the contribution of each radioisotope in the composite. Direct curve subtraction may be employed where the number of isotopes is not excessive, but a computer technique has been developed which vastly simplifies the determination while affording superior accuracy.

All data from the pulse height analyzer is automatically printed out in the form of a channel designation and a digit representing counts for that channel in a unit time. This information is key-punched onto IBM cards and fed to an IBM 704 computer, together with information representing the background count. The computer is first set to subtract the background count, channel by channel, from the samples and the standards. Where due to statistical fluctuations negative results are obtained on subtraction, the result is set equal to zero for that channel. The background-free spectra are then compared by the computer as follows:

Let $S_1(n)$ to $S_4(n)$ be the counts per channel, $n$ ($0<n<200$), for each of the four standards and $u(n)$ be the same for a given sample. (The fifth or mixture standard is treated as a sample as a continuous check.) If $A_1$ to $A_4$ are the relative amounts of the four isotopes in the sample then:

$$\sum_{i=1}^{4} A_i S_i(n) \simeq u(n) \tag{A1}$$

with the "approximately" sign indicating that because of statistical fluctuations in the counting process the equality will not be exact for any channel. To determine the best values for the four $A_i$'s, it is necessary to minimize the R.M.S. error over the 200 channels with respect to each $A_i$:

$$\frac{\partial}{\partial A_i} \cdot \sum_n \frac{\left\{u(n) - \sum_{i=1}^{4} A_i S_i(n)\right\}^2}{\sum_{i=1}^{4} A_i S_i(n)} = 0 \tag{A2}$$

Where the denominator is chosen to account for the Poisson distribution arising in the counting process. Differentiation in (A2) results in four non-linear equations for the values of the $A_i$'s, which cannot be solved explicitly. It is therefore necessary to solve the approximate equation:

$$\frac{\partial}{\partial A_i} \cdot \sum_n \frac{\left\{u(n) - \sum_{i=1}^{4} A_i S_i(n)\right\}^2}{u(n)} = 0 \tag{A3}$$

which upon differentiation and rearrangement gives the matrix equation:

$$[\Xi ij]\{A_i\} = \{\Gamma_i\} \tag{A4}$$

where the elements for the symmetric matrix $[\Xi ij]$ are:

$$\Xi ij = \sum_n \frac{S_i(n) \cdot S_j(n)}{u(n)} \tag{A5}$$

and $$\Gamma_i = \sum_n \frac{S_i(n)}{u(n)} \tag{A6}$$

By solution of (A4) four approximate values of the $A_i$'s are obtained, call them $A_i(1)$. These values are used to compute a new denominator for (A3), call it $u_1(n)$:

$$u_1(n) = \sum_{i=1}^{4} A_i(1) \cdot S_i(n) \tag{A7}$$

and (A3) becomes for the second approximation:

$$\frac{\partial}{\partial A_i} \cdot \sum_n \frac{\left\{u(n) - \sum_{i=1}^{4} A_i S_i(n)\right\}}{u_1(n)} \tag{A8}$$

which may again be solved for a new set of values, $A_i(2)$, and the whole process repeated until some convergence criterion is met, say:

$$\left|\frac{A_i(M) - A_i(M-1)}{A_i(M)}\right| < \epsilon \tag{A9}$$

for all $A_i$. The computer makes the above iteration to a programmed convergenece criterion $\epsilon$. For normal samples, convergence to $\epsilon = 0.001$ occurs in about three iterations. The machine prints out the values of the $A_i$'s computed for each iteration; convergence to even smaller values of $\epsilon$ is rapid and generally non-oscillatory.

Once the relative amounts of the four isotopes in the sample are determined, by "trivial" material balance calculations the amounts of each originally impregnated catalyst in the unit's inventory are computed. It may be necessary to adjust the computations to allow for the addition of makeup fresh catalyst to the unit and the deliberate withdrawal of equilibrium catalyst, but again such computations are conventional.

The results may be plotted on a chart of the type presented as FIGURE 2 herein. This chart shows the results of testing three commercial catalysts "A," "B," "C," in a large commercial fluid catalytic cracking unit. It will be observed that catalyst "A" tended to remain longest in the unit, which is evidence of its superior attrition resistance. Catalyst "B" is somewhat less resistant, while catalyst "C" is poorest in this regard.

The information obtained by the inventive technique possesses the advantage of permitting loss determinations to be made of several different catalysts simultaneously. Thus, any effects on catalyst loss due to such factors as deliberate or inadvertent changes in conversion or catalyst regeneration conditions and the like are experienced by all catalysts simultaneously, and hence any variables other than the inherent physical stability of the catalyst are compensated for.

The inventive system has numerous other substantial advantages. With respect to catalyst impregnation, any desired amount of radioisotope concentration may be employed, and no changes to the physical or chemical properties of the catalyst are encountered. The impregnation system is extremely versatile and can accommodate a considerable variety of isotopes. The counting technique is accurate and convenient, and does not require any special equipment or unduly dangerous products, provided normal radiation safety procedures are observed. Also, by permitting the use of relatively short half life isotopes, radioactivity soon diminishes to a negligible level. Furthermore, there is no need to account for radioactive decay, since this is compensated for by employing standard samples and counting these at substantially the same time as are the regular samples, e.g. within 24 hours, but preferably within the same hour.

From the foregoing description it is evident that we have provided an extremely facile method of determining catalyst loss, or retention, rates in fluid catalytic conversion units, together with a technique for uniformly impregnating the catalysts with radioactive tracers. While the invention has been described in conjunction with specific embodiments thereof, these are by way of illustration only. Many alternatives, modifications, and variations will be apparent to those skilled in the art in view of our disclosure, and accordingly it is intended to embrace all such alternatives, modifications, and variations as fall within the spirit and broad scope of the appended claims.

We claim:

1. A process for rapidly but uniformly impregnating a finely divided adsorbent catalyst having varied particle size distribution with a radioactive metal isotope without any noticeable alteration of catalyst properties which process comprises forming a slurry of said catalyst with an inert volatile organic liquid, introducing into said slurry a solution containing said radioactive metal isotope in the form of a soluble coordination compound dissolved in said inert volatile organic liquid, the volatility of said liquid being such to permit its removal from the catalyst without the use of undue temperatures, intimately mixing the slurry and solution at the boiling point of said liquid to obtain rapid but uniform impregnation of said catalyst with said isotope, removing excess liquid, and drying the resultant impregnated solid.

2. Process of claim 1 wherein said compound is a coordination compound of thenoyltrifluoroacetone.

3. Process of claim 1 wherein said isotope is zirconium-95.

4. Process of claim 1 wherein said isotope is hafnium-181.

5. Process of claim 1 wherein said isotope is scandium-46.

References Cited by the Examiner
UNITED STATES PATENTS
3,070,696   12/1962   McEwen _____ 250—106

OTHER REFERENCES
Kinsella, Jr. et al.: Better Catalyst Loss Studies, Article from Petroleum Processing, November 1955, 6 pages.

REUBEN EPSTEIN, *Primary Examiner.*
CARL D. QUARFORTH, *Examiner.*